Nov. 9, 1965

C. W. DICK 3,216,429

DEVICE FOR CLEANING THE THROW AWAY TYPE
OF AIR FILTERS OF AUTOMOBILES

Filed Jan. 22, 1964

INVENTOR
CHARLES W. DICK

BY Shepherd & Campbell
ATTORNEY

Nov. 9, 1965                    C. W. DICK                    3,216,429
              DEVICE FOR CLEANING THE THROW AWAY TYPE
                   OF AIR FILTERS OF AUTOMOBILES
Filed Jan. 22, 1964                                   2 Sheets-Sheet 2

INVENTOR
CHARLES W. DICK

BY
Shepherd & Campbell
ATTORNEY

_United States Patent Office_

3,216,429
Patented Nov. 9, 1965

3,216,429
DEVICE FOR CLEANING THE THROW AWAY
TYPE OF AIR FILTERS OF AUTOMOBILES
Charles W. Dick, 2926 Georgia St., Paducah, Ky.
Filed Jan. 22, 1964, Ser. No. 339,435
1 Claim. (Cl. 134—102)

This invention relates to a device for cleaning the throw-away type air filters of automobiles and like vehicles that are driven by internal combustion engines. The filters, which the device of the invention is intended to clean and restore to a condition as good as when new, are of such simple and economical construction that it is now the common practice to discard them when they become clogged with oil-laden road dust, and to substitute a new filter for them.

The filters under consideration comprise a ring-like body of considerable diameter, having as the filtering element a corrugated bellows strip of cheap, paper-like material, which lies vertically between upper and lower ring-like elements, with its corrugations vertically disposed. In use in an automobile, these filters are disposed over the air inlet to the engine carburetor, and air is drawn through the filtering element and into the air intake of the engine carburetor.

It is important that a flow of clean air to the carburetor be provided for the double reason that the flow of clean air not only prevents excessive engine wear that would be caused by grit-laden air, but also because obstruction to free air flow through the filter causes a choking effect of the nature of the "choking" imposed when an engine is being started and which results in giving a mixture of above normal richness at the time of starting. However, normally this rich mixture is yielded only until the engine gets started, after which the normal leaner mixture is supplied by the carburetor.

It is clear that if the choking of the air flow continues, the effect will be to feed too rich a mixture to the engine, with consequent roughness of operation of the engine and fouling of spark plugs and cylinders. When the air filter is clean and free of clogging dirt, oily dust and the like, there is no disturbance of the normal operation of the carburetor, and the engine will operate in a proper and even manner.

It is the primary object of this invention to provide a device for the quick cleaning of filters of the type described so that a clogged filter may be made as clean as a new filter. Thus, it is not necessary to discard filters, but they may be used over and over again.

The means employed and the manner of operation of the device of the invention will be best understood by reference to the accompanying drawings, wherein.

Figure 1:
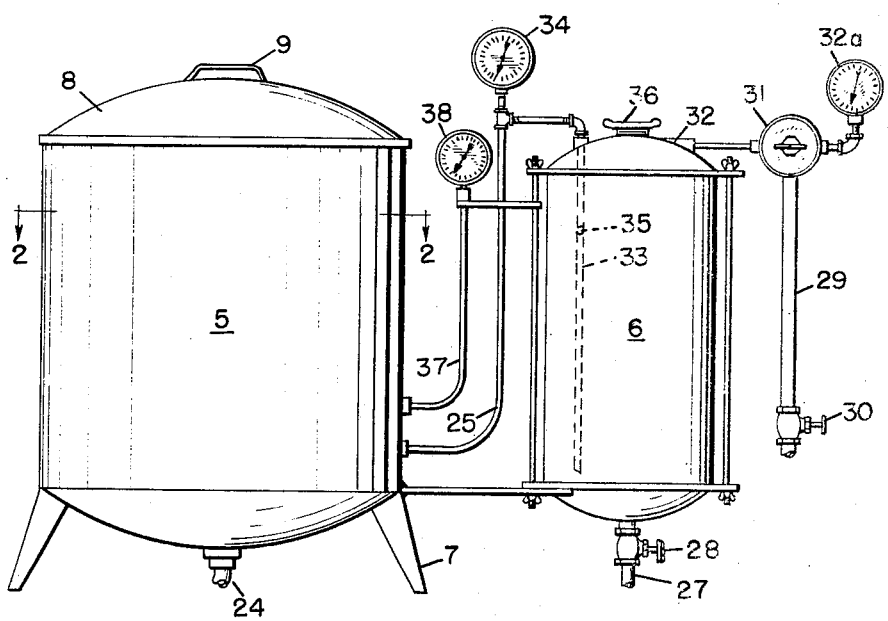
FIGURE 1 is a front elevation of a device constructed in accordance with the invention.
Figure 2:
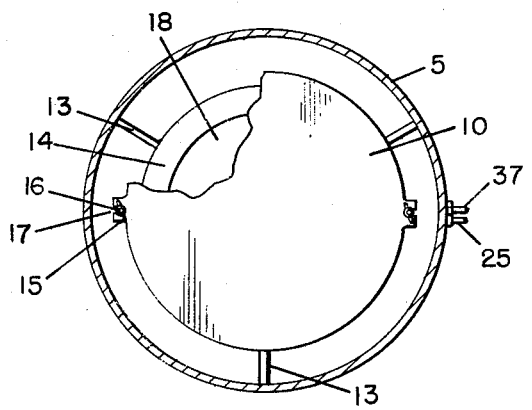
FIG. 2 is a horizontal section upon line 2—2 of FIG. 1.
Figure 3:
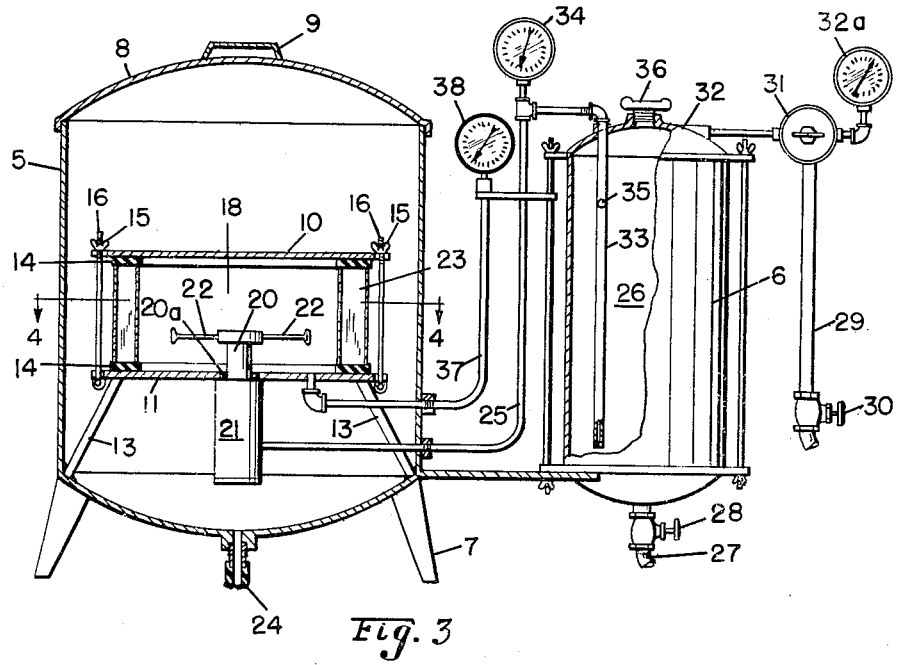
FIG. 3 is a vertical sectional view through the filter cleaning compartment showing a filter in position to be cleaned.
Figure 4:
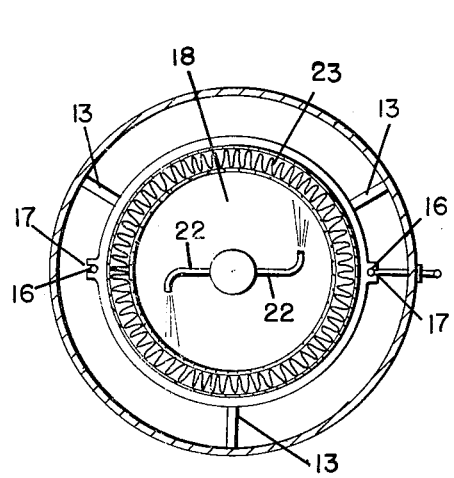
FIG. 4 is a horizontal sectional view upon line 4—4 of FIG. 3.
Figure 5:
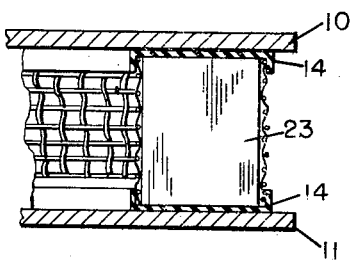
FIG. 5 is an enlarged vertical sectional view through one side of the filter.

The filter cleaning apparatus comprises a main cleaning compartment 5 and a mixing chamber 6, in which mixing chamber water and a detergent of very low sudsing power are mixed to form the cleaning liquid employed. The main compartment is of tank-like form and is supported upon legs 7 and which has a freely removable lid 8 that is provided with a lifting handle 9.

Disposed within cleaning compartment 5 is a pair of flat plates 10 and 11, vertically spaced to receive between them and the annular filter that is to be cleaned. These plates complementally constitute a filter support disposed within the cleaning compartment. The lower plate is supported upon legs 13, the lower ends of which legs are welded or otherwise secured to tank 5.

The filters to be cleaned comprise upper and lower rings 14, the faces of which present gasket-forming surfaces which make fluid-tight engagement with the faces of the upper and lower plates when said plates are drawn forcibly together by the tightening of thumb nuts 15, which nuts are threaded upon rods 16. The lower ends of rods 16 are hingedly connected to the lower plate. The edges of the upper plate are notched at 17 to receive the rods 16.

When the filter lies in place between plates 10 and 11, it encloses a space 18, the surrounding wall of which consists of the inner wall of the filter being cleaned. A rotative stem 20, journaled in bearing element 20a, has its lower end projecting into a cylinder 21. Stem 20 has a vertical channel therein through which pressure fluid is conducted from cylinder 21 to radial tubes 22. The outer ends of the tubes are curved in opposite directions, and the tubes are flattened at their discharge ends in such manner that pressure fluid from cylinder 21 will impart rotation to stem 20 and a wide spray of the cleaning fluid (water and detergent) will be forcibly impacted against the inner wall of the filter.

This cleaning spray passes outwardly through the corrugated filter material 23, carrying with it the dirt, grit, road oils, and the like, which have been clogging the filter. The dislodged dirty particles fall to the bottom of receptacle 5 and are discharged from drain 24.

The cleaning liquid which drives the rotative spray head is delivered into cylinder 21 through a pipe 25. This pipe receives its supply from a mixing receptacle 26. A water supply pipe 27 enters receptacle 26 at the bottom thereof, and said pipe is provided with a shut-off valve 28.

An air supply line 29 that is provided with a shut-off valve 30 and a pressure-reducing valve 31, enters the dome 32 of the receptacle 26 at the right in FIG. 1, and imposes upon the contents of said receptacle a pressure that is determined by the setting of the pressure-reducing valve. A gauge 32a indicates the existing pressure in receptacle 26.

The pipe 25 leads to and enters the left side of the dome 32 of receptacle 26 and terminates in a pick up drop pipe 33. A gauge 34 on pipe 25 indicates the nozzle pressure at the revolving arms of the spray head. Drop pipe 33 has formed in its side an inlet opening 35. This opening is made slightly larger than the opening into the bottom of the drop pipe. I have found a proportion of about ⅛ inch for the bottom opening and ³⁄₁₆ for the upper opening to yield satisfactory results.

Dome 32 is provided with a manually removable filler cap 36. When this cap is removed, a desired quantity of detergent of low sudsability is introduced into the receptacle 26 and the receptacle is filled with water from the water pipe, after which the water is shut off. The pressure-reducing valve in air supply line 29 is employed because the initial air pressure will usually be derived from garage air tanks used in tire inflation and which pressure is usually much higher than that needed in the mixing receptacle. The pressure-reducing valve will deliver the desired air pressure.

When the water valve is closed, the contents of the mixing chamber will then constitute a charge that is to be delivered to and which will clean a filter. The mixing chamber is always under an overall air pressure. At the beginning of the cleaning of a filter, the liquid cleaning material will enter the spray supply line through both the upper and lower openings in the drop pipe. After the initial dislodging of the caked dirt, the flow outwardly through the filter becomes more free, and after the level of the cleaning material drops below the upper opening in the drop pipe, the liquid intake will be through the reduced lower opening into the drop pipe. However, air will enter the opening at the upper opening of the drop pipe, and a mixture of this air and the liquid cleaning compound will continue to be forcibly directed outwardly through the filter but with a greater proportion of air than at the beginning of the cleaning operation.

A pipe 37 leads from space 18 through the bottom plate 11 and carries a gauge 38. This gauge indicates the pressure existent in space 18 and consequently indicates the degree of cleanliness of the filter. I have found that with a very dirty filter, the pressure in space 18 may be five pounds or more at the start of the cleaning operation because of the lack of escape route for the cleaning liquid. Then, as the dirt is dislodged and more and more passages become available through the filter, the resistance to flow decreases, and the gauge pressure may drop to less than one pound.

Since, when the filter is in use with an engine, the air flow is from the outside to the inside of the filter, the dirt that is stopped is trapped in the vertical valleys of the corrugated filter wall. The discharge of the cleaning spray of water and detergent is in the reverse direction, and thus, at the beginning of the cleaning operation, large pieces of caked dirt are dislodged from the outside of the filter, which dirt falls downwardly to the drain. Further forcible spraying of the cleaning mixture against and through the filter material from the inside and outwardly washes every particle of obstructing material from the filter and leaves it as clean as new.

This invention provides such simple and economical means for cleaning used filters that they can be installed in automobiles at very low cost. The result will be that motorists will be inclined to change filters much more frequently than has heretofore been the case. Great economies in automobile operation will follow by obliterating the unobserved choking of engines by dirty air filters.

It is to be understood that the invention is not limited to the precise construction set forth, but that it includes within its purview whatever changes fairly fall within either the terms or the spirit of the appended claim.

I claim:

A device for cleaning the annular air filters of automobiles, comprising a cleaning compartment having a removable cover for the introduction of a filter to be cleaned, a filter support within said compartment comprising a pair of upper and lower spaced plates between which plates a filter to be cleaned is placed, said plates conforming to the upper and lower faces of the filter, means for drawing the plates forcibly against the upper and lower faces of the filter to establish a substantially air-tight compartment within the annular filter, a spray head within said compartment, said spray head being located to forcibly discharge a cleaning liquid along and around the inner wall of the annular filter, means for delivering a cleaning liquid under pressure to the spray head, and a drain in the cleaning compartment for permitting the escape of dirt dislodged from the outer side of the filter, and wherein the means for delivering the cleaning liquid to the spray head comprises a mixing chamber, a source of water supply leading to said chamber, a source of air under pressure connected to the mixing chamber, a removable closure element for permitting the introduction of a detergent into said mixing chamber, a cleaning fluid discharge line leading to the spray head from the mixing chamber and comprising a drop pipe leading downwardly from the upper to the lower portion of the mixing chamber, said drop pipe constituting the entrance element of the element for delivering the cleaning liquid to the spray head, said drop pipe having an opening into its lower end and an additional opening through its wall near the top thereof, the latter opening being a little larger than the opening into the bottom of said drain pipe.

References Cited by the Examiner

UNITED STATES PATENTS

| | | | |
|---|---|---|---|
| 2,020,350 | 11/35 | Bertschinger | 134—168 X |
| 2,432,290 | 12/47 | Davis | 134—167 |
| 2,677,382 | 5/54 | Cushing | 134—167 |
| 2,919,704 | 1/60 | Butler | 134—166 X |

CHARLES A. WILLMUTH, *Primary Examiner.*

G. J. NORTH, *Examiner.*